United States Patent
Kim et al.

(10) Patent No.: US 9,048,997 B2
(45) Date of Patent: *Jun. 2, 2015

(54) APPARATUS AND METHOD USING MATRIX NETWORK CODING

(71) Applicant: Samsung Electronics Co., Ltd., Suwon-si (KR)

(72) Inventors: Kwang Taik Kim, Yongin-si (KR); Chan Soo Hwang, Yongin-si (KR); Vahid Tarokh, Cambridge, MA (US)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 14/172,186

(22) Filed: Feb. 4, 2014

(65) Prior Publication Data

US 2014/0149831 A1 May 29, 2014

Related U.S. Application Data

(63) Continuation of application No. 14/083,912, filed on Nov. 19, 2013, which is a continuation of application No. 13/027,438, filed on Feb. 15, 2011, now Pat. No. 8,612,833.

(30) Foreign Application Priority Data

Jun. 11, 2010 (KR) .................. 10-2010-0055420

(51) Int. Cl.
  *H03M 13/00* (2006.01)
  *H04L 1/00* (2006.01)
  *G06F 11/10* (2006.01)

(52) U.S. Cl.
  CPC ............ *H04L 1/0076* (2013.01); *H04L 1/0047* (2013.01); *G06F 11/10* (2013.01)

(58) Field of Classification Search
  CPC .......................... H04L 1/0057; H04L 1/0061
  USPC .......................... 714/776, 758, 757, 801, 780
  See application file for complete search history.

(56) References Cited

U.S. PATENT DOCUMENTS 4,769,818 A * 9/1988 Mortimer .................... 714/755
5,426,652 A    6/1995 Heiman
(Continued)

FOREIGN PATENT DOCUMENTS

KR   10-2009-0112848   10/2009
WO   WO 2007/054872    5/2007

OTHER PUBLICATIONS

Berlekamp, et al. "On the inherent intractability of certain coding problems." *IEEE Transactions on Information Theory*, vol. 24, No. 3 (1978): 384-386.

(Continued)

*Primary Examiner* — Fritz Alphonse
(74) *Attorney, Agent, or Firm* — NSIP Law

(57) ABSTRACT

Provided are a communication apparatus and method using a matrix network coding scheme. The communication apparatus includes a reception unit to receive a corrupted packet including a plurality of corrupted words, and a controller to estimate a first decoded word corresponding to the corrupted words based on the corrupted words and a generator matrix. The controller generates a second decoded word corresponding to the corrupted words based on a codebook and the estimated first decoded word. The codebook is based on the generator matrix. The controller generates a message based on a plurality of second decoded words respectively corresponding to the plurality of corrupted words.

17 Claims, 9 Drawing Sheets

(56) References Cited

U.S. PATENT DOCUMENTS

| | | | |
|---|---|---|---|
| 5,550,870 | A | 8/1996 | Blaker et al. |
| 5,828,676 | A | 10/1998 | Hurlbut et al. |
| 6,330,665 | B1 * | 12/2001 | Wise et al. ............... 712/300 |
| 6,757,348 | B1 | 6/2004 | Vila et al. |
| 7,577,186 | B2 * | 8/2009 | Thomas et al. ............ 375/148 |
| 7,813,272 | B2 * | 10/2010 | Seki ........................... 370/229 |
| 7,873,224 | B2 | 1/2011 | Jalil et al. |
| 8,134,503 | B2 * | 3/2012 | Na et al. ..................... 342/370 |
| 8,223,628 | B2 | 7/2012 | Thyagarajan |
| 2004/0039979 | A1 | 2/2004 | Garani |
| 2004/0160943 | A1 | 8/2004 | Cain |
| 2005/0207350 | A1 | 9/2005 | Bloebaum |
| 2008/0267106 | A1 | 10/2008 | Buddhikot et al. |
| 2009/0103472 | A1 | 4/2009 | Ni et al. |
| 2009/0141676 | A1 | 6/2009 | Maheshwari et al. |

OTHER PUBLICATIONS

Lodge, et al. "Separable MAP "filters" for the decoding of product and concatenated codes." *Proc. of IEEE ICC*, (1993): 1740-1745.

Forney, Jr. et al. "The dynamics of group codes: state spaces, trellis diagrams, and canonical encoders." *IEEE Transactions on Information Theory*, vol 39, No. 5 (1993): 1491-1513.

Hagenauer, et al. "Iterative decoding of binary block and convolutional codes." *IEEE Transactions on Information Theory*, vol. 42, No. 2 (1996): 429-445.

Pyndiah. "Near-optimum decoding of product codes: block turbo codes." *IEEE Transactions on Communications*, vol. 46, No. 8 (1998): 1003-1010.

Ahiswede, et al. "Network information flow." *IEEE Transactions on Information Theory*, vol. 46, No. 4 (2000): 1204-1216.

Koetter, et al. "An algebraic approach to network coding." IEEE/ACM Transactions on Networking, vol. 11, No. 5 (2003):782-795

Li, et al. "Linear network coding." *IEEE Transactions on Information Theory*, vol. 49, No. 2 (2003): 371-381.

Ho, et al. A random linear network coding approach to multicast *IEEE Transactions on Information Theory*, vol. 52, No. 10 (2006): 4413-4430.

Katti, et al. "XORs in the air: practical wireless network coding." *Proc. of ACM SIGCOMM* (2006): (40 pages).

Yeung, et al. "Network error correction, I: Basic concepts and upper bounds." *Communications in Information & Systems*, vol. 6, No. 1 (2006): 19-35.

Cai, et al. "Network error correction, II: Lower bounds." *Communications in Information & Systems*, vol. 6, No. 1 (2006): 37-54.

Fragouli, et al. "Network coding applications". Foundations and Trends in Networking, vol. 2, No. 2. (2007): 135-269.

IEEE P802.11s/D3.0, "Part 11: Wireless LAN Medium Access Control (MAC) and Physical Layer (PHY) specifications, Amendment 10: Mesh Networking," (2009): (372 pages).

Kim, et al. "Network error correction from matrix network coding." In Proc. of Information Theory and Applications Workshop (ITA), 2001. IEEE, (2011): (9 pages).

* cited by examiner

APPARATUS AND METHOD USING MATRIX NETWORK CODING

CROSS-REFERENCE TO RELATED APPLICATION(S)

This application is a Continuation Application of U.S. application Ser. No. 14/083,912, filed Nov. 19, 2013, which is a Continuation Application of U.S. application Ser. No. 13/027,438, filed Feb. 15, 2011, now U.S. Pat. No. 8,612,833, issued Dec. 17, 2013, which claims the benefit under 35 U.S.C. §119(a) of Korean Patent Application No. 10-2010-0055420, filed on Jun. 11, 2010, in the Korean Intellectual Property Office, the entire disclosures of which are incorporated herein by reference for all purposes.

BACKGROUND

1. Field

The following description relates to a coding scheme used in a wireless network, and more particularly, to a communication apparatus and a communication method using the network coding scheme.

2. Description of Related Art

Studies are being conducted on communication protocols that may be applied to a wireless network, such as a mesh network, an ad-hoc network, a sensor network, and the like. Nodes in a wireless network have limited transmission power, and channels between nodes may change in state. As a result, there are limitations on methods for improving the performance of a wireless network.

There is an increasing interest in applying network coding schemes to a wireless network to improve performance. In a wireless network using network coding schemes, a relay node may encode messages corresponding to at least two nodes to generate a network coded message, and may transmit the message to the at least two nodes. The at least two nodes may decode the network coded message to extract the desired messages. However, often the messages may become corrupted and may not be properly received by the relay or by one or more of the nodes in the wireless network.

SUMMARY

In one general aspect, there is provided a communication apparatus comprising a transmission and reception unit to receive k input packets and to output an output packet, the k input packets including first to $k^{th}$ input packets, and a controller to select k matrices, to generate q sub-output packets, and to generate the output packet including first to $q^{th}$ sub-output packets, the k matrices including first to $k^{th}$ matrices and the q sub-output packets including the first to $q^{th}$ sub-output packets, wherein the first to $k^{th}$ input packets each comprise q sub-input packets respectively having a length of p, the q sub-input packets including first to $q^{th}$ sub-input packets, the first to $k^{th}$ matrices each include p rows and p columns, and the first to $q^{th}$ sub-output packets are generated based on the k input packets and the k matrices.

A $j^{th}$ sub-output packet may be a sum of a 1j multiplied matrix to a kj multiplied matrix when 1≤i≤k, 1≤j≤q, and an $i^{th}$ matrix multiplied by a $j^{th}$ sub-input packet of an $i^{th}$ input packet may be defined as an ij multiplied matrix.

The first to $k^{th}$ matrices may be invertible.

The first to $k^{th}$ matrices may be randomly selected.

In another aspect, there is provided a communication apparatus comprising a reception unit to receive a corrupted packet including a plurality of corrupted words, and a controller to estimate a first decoded word corresponding to the corrupted words based on the corrupted words and a generator matrix, to generate a second decoded word corresponding to the corrupted words based on a codebook and the estimated first decoded word, and to generate a message based on a plurality of second decoded words respectively corresponding to the plurality of corrupted words, wherein the generator matrix comprises a matrix as an element and the codebook is based on the generator matrix.

The controller may generate a plurality of input bit vectors using the generator matrix and generate a log-likelihood value of the first decoded word corresponding to the corrupted words based on the plurality of input bit vectors and the corrupted words, to estimate the first decoded word.

The controller may generate a parity check matrix based on the generator matrix, generate a plurality of different candidate vectors by performing a hard decision on part of a plurality of symbols included in the corrupted words based on a log-likelihood probability of each of the plurality of symbols and by substituting 0 or 1 for the remaining symbols, search the plurality of candidate vectors for a plurality of codewords that have a product of a codeword multiplied by the parity check matrix being 0, generate a plurality of input bit vectors encoded by the generator matrix into one of the plurality of codewords, and generate a log-likelihood value of the first decoded word corresponding to the corrupted words based on the plurality of input bit vectors and the corrupted words, to estimate the first decoded word.

The controller may determine a number of unreliable symbols that are represented by w, and generate a log-likelihood probability of each of the plurality of symbols included in the corrupted words to generate the plurality of different candidate vectors, the symbols are symbols except for symbols having small w absolute values of the log-likelihood probability from among the plurality of symbols, and a number of the plurality of different candidate vectors is $2^w$.

The controller may generate a log-likelihood value of the first decoded word by generating a log-likelihood ratio of each bit of the first decoded word and by combining the log-likelihood value of the first decoded word using each bit, the log-likelihood ratio of each bit is generated by generating a probability of the bit to have a value of 1 and generating the probability of the bit to have a value of 0, the probability of the bit to have the value of 1 is a probability at which the corrupted words are generated when a candidate vector having the bit of 1 is generated among the plurality of different candidate vectors, and the probability of the bit to have the value of 0 is a probability at which the corrupted words are generated when a candidate vector having the bit of 0 is generated among the plurality of different candidate vectors.

The controller may generate the second decoded word based on the estimated first decoded word and a map for the code book using a soft or hard decoder.

The controller may generate a parity check matrix based on the generator matrix, generate a syndrome vector obtained by multiplying the parity check matrix by the corrupted words, search a plurality of unique vectors among binary strings having a minimal Hamming weight for a product of a unique vector multiplied by the parity check matrix being the syndrome vector, generate a plurality of codewords which are a sum of the corrupted words and one of the plurality of unique vectors, generate a plurality of input bits vectors encoded by the generator matrix into one of the plurality of codewords, and estimate the plurality of input bit vectors to be the first decoded word, to estimate the first decoded word.

The controller may generate the second decoded word based on the estimated first decoded word and the code book using a hard decoder.

The controller may estimate the first decoded word by selecting one of a transformed sphere decoding and coset decoding based on a state of the communication apparatus and generates the second decoded word.

In another aspect, there is provided a network coding method of a communication apparatus, the method comprising receiving k input packets, the k input packets including first to $k^{th}$ input packets, the first to $k^{th}$ input packets each comprising q sub-input packets respectively having a length of p, and the q sub-input packets including first to $q^{th}$ sub-input packets, selecting k matrices, the k matrices including first to $k^{th}$ matrices and the first to $k^{th}$ matrices each including p rows and p columns, generating q sub-output packets based on the k input packets and the k matrices, the q sub-output packets including the first to $q^{th}$ sub-output packets, and outputting the output packet including first to $q^{th}$ sub-output packets.

In another aspect, there is provided a decoding method of a communication apparatus, the method comprising receiving a corrupted packet including a plurality of corrupted words, estimating a first decoded word corresponding to the corrupted words based on the corrupted words and a generator matrix, generating a second decoded word corresponding to the corrupted words based on a codebook and the estimated first decoded word, and generating a message based on a plurality of second decoded words respectively corresponding to the plurality of corrupted words, wherein the generator matrix comprises a matrix as an element and the codebook is based on the generator matrix.

The estimating of the first decoded word may comprise generating a plurality of input bit vectors using the generator matrix and generating a log-likelihood value of the first decoded word corresponding to the corrupted words based on the plurality of input bit vectors and the corrupted words, so that the first decoded word corresponding to the corrupted words is estimated.

generating of the plurality of input bit vectors may comprise generating a parity check matrix based on the generator matrix, generating a plurality of different candidate vectors by performing hard decision on part of a plurality of symbols included in the corrupted words based on a log-likelihood probability of each of the plurality of symbols and by substituting 0 or 1 for the remaining symbols, searching the plurality of candidate vectors for a plurality of codewords that have a product of a codeword multiplied by the parity check matrix being 0, and generating a plurality of input bit vectors encoded by the generator matrix into one of the plurality of codewords.

The generating of the plurality of different candidate vectors may comprise determining a number of unreliable symbols, the number of unreliable symbols are represented by w, and generating a log-likelihood probability of each of the plurality of symbols included in the corrupted words, the symbols are symbols except for symbols having small w absolute values of the log-likelihood probability among the plurality of symbols, and a number of the plurality of different candidate vectors is $2^w$.

The estimating of the first decoded word may comprise generating a parity check matrix based on the generator matrix, generating a syndrome vector obtained by multiplying the parity check matrix by the corrupted words, searching a plurality of unique vectors among binary strings having a minimal Hamming weight for a product of a unique vector multiplied by the parity check matrix being the syndrome vector, generating a plurality of codewords which are a sum of the corrupted words and one of the plurality of unique vectors, generating a plurality of input bits vectors encoded by the generator matrix into one of the plurality of codewords, and estimating the plurality of input bit vectors to be the first decoded word.

In another aspect, there is provided a communication apparatus comprising a transmission and reception unit configured to receive first to $k^{th}$ input packets that each comprise first to $q^{th}$ sub-input packets respectively having a length of p, and to output an output packet, and a controller configured to select first to $k^{th}$ matrices each including p rows and p columns, to generate first to $q^{th}$ sub-output packets, and to generate the output packet including first to $q^{th}$ sub-output packets based on the first to $k^{th}$ input packets and the first to $k^{th}$ matrices.

In another aspect, there is provided a communication apparatus comprising a transmission and reception unit configured to receive one or more corrupted packets from another communication apparatus, and a controller configured to reconstruct each of the one or more received corrupted packets by generating a hard decision estimate on each of the received corrupted packets and performing network error correction on each of the one or more received corrupted packets based on the hard decision estimate for each respective received corrupted packet.

The controller may further perform horizontal decoding and vertical decoding on the one or more received corrupted packets to reconstruct the received one or more corrupted packets.

Other features and aspects will be apparent from the following detailed description, the drawings, and the claims.

Figure 1:
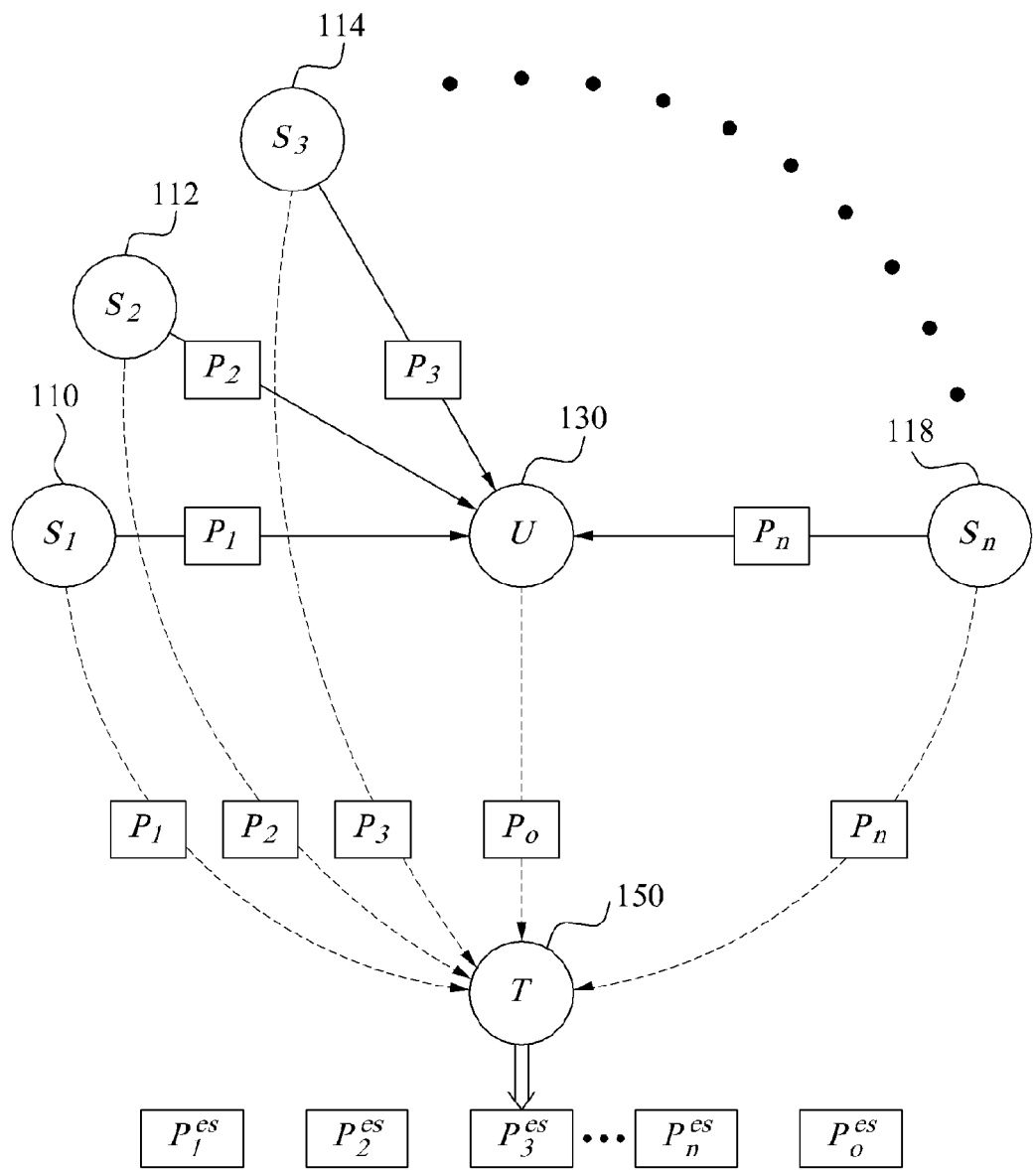
FIG. 1 is a diagram illustrating an example of a network system.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, description of well-known functions and constructions may be omitted for increased clarity and conciseness.

FIG. 1 illustrates an example of a network system.

In this example, the wireless network includes a first source node $S_1$ 110, a second source node $S_2$ 120, and third to $n^{th}$ source nodes $S_3$ to $S_n$ 114 to 118.

For example, an underlying modulation scheme in the wireless network may be a binary phase shift keying (BPSK) that may be used to map a bit of 0 into a real number of 1 and to map a bit of 1 into a real number of −1.

The wireless network includes a relay node U 130 and a target node T 150.

For example, the source nodes 110 to 118, the relay node U 130, and the target node T 150 may be communication apparatuses such as a mobile terminal, a computer, and the like.

In the network, a communication apparatus performing functions of the source nodes 110 to 118, the relay node 130, and the target node 150 does not function as only a single node. A physical communication apparatus in the network may operate as at least one node from among the source nodes 110 to 118, the relay node 130, and the target node 150 at the same time or with lapse of time. For example, while the nodes are labeled as source nodes 110 to 118, relay node 130, and target node 150, it should be appreciated that a node may function as one or more of a source node, a target node, and a relay node within the network. As an example, the relay node 130 may also function as a source node and as a target node.

In this example, the respective source nodes 110 to 118 transmit packets $P_1$ to $P_n$ to the target node 150. For example, $S_1$ may transmit $P_1$ to the target node T.

For example, the respective source nodes 110 to 118 may transmit the packets $P_1$ to $P_n$ to the relay node 130 and to the target node 150. As described above, a node may transmit a packet to a plurality of different nodes by broadcasting or multicasting.

The relay node 130 receives $P_1$ to $P_n$ from the source nodes 110 to 118, shown in a solid line. The relay node 130 may generate an output packet $P_0$ based on the received $P_1$ to $P_n$ and may transmit $P_0$ to the target node 150, as shown by a dotted line.

The target node 150 receives $P_1$ to $P_n$ from the source node 110 to 118 and receives $P_n$ from the relay node 130, shown by the dotted line.

One or more of the packets received by the relay node 130 and/or the target node 150 may be corrupted during the transmission after the packets are output by the source nodes 110 to 118 or the relay node 130. Packets may be corrupted by various factors. For example, the packets $P_1$ to $P_n$ and $P_0$ may be transmitted in a noisy environment and may be become corrupted from the noise.

The target node 150 may make a hard decision on the corrupted packets and may generate hard decision-made estimated packets $P_1^{es}$ to $P_n^{es}$ and $P_o^{es}$. For example, the target node 150 may generate an estimated packet $P_1^{es}$ based on the received packet $P_1$ that is corrupted.

The target node 150 may perform a network error correction based on the estimated packets $P_1^{es}$ to $P_n^{es}$ and $P_o^{es}$ to reconstruct the packets $P_1$ to $P_n$, initially transmitted by the source nodes 110 to 118.

FIG. 1 illustrates an example of one target node 150, however, it should be appreciated that the examples described herein may be applied to a plurality of target nodes. For example, the source nodes 110 to 118 and the relay node 150 may respectively transmit the packets $P_1$ to $P_n$ and $P_o$ to the plurality of target nodes, and the plurality of target nodes may receive and process the packets $P_1$ to $P_n$ and $P_o$, respectively.

For example, the packets may be transmitted in a multicast scenario in which $P_1$ to $P_n$ are reconstructed in the plurality of target nodes, respectively. As another example, the packets may be transmitted in a unicast scenario in which each of $P_1$ to $P_n$ is reconstructed in one of the target nodes $T_1$ to $T_n$. As another example, the packets may be transmitted in a mixed scenario in which some nodes use the multicast scenario and other nodes use the unicast scenario.

For example, a communication link between the nodes may be a discrete, a Gaussian, a fading channel, and the like, which may be modeled, wherein a Rayleigh or Rician fading channel may be used.

Figure 2:
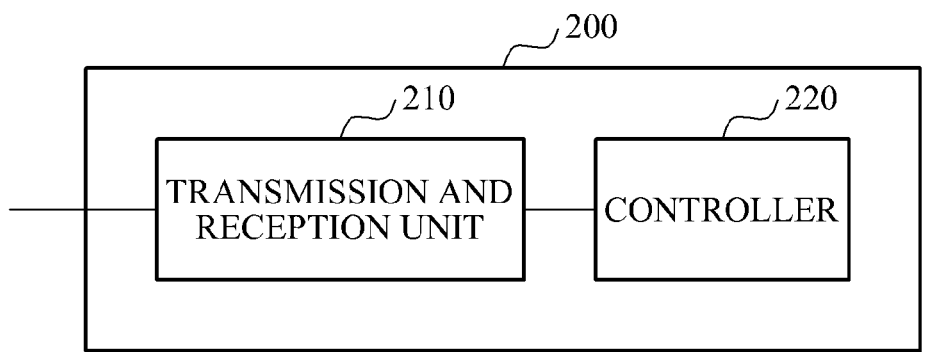
FIG. 2 is a diagram illustrating an example of a communication apparatus.

FIG. 2 illustrates an example of a communication apparatus.

The communication apparatus 200 may correspond to at least one node from among the source nodes 110 to 118, the relay node 130, and the target node 150.

The communication apparatus 200 includes a transmission and reception unit 210 and a controller 220.

The transmission and reception unit 210 may output a packet generated by the controller 220, may receive a packet transmitted by another communication apparatus, and/or may transmit the packet to the controller 220.

The controller 220 may process the packet received by the transmission and reception unit 210. As a result, the controller 220 may generate a packet and transmit the packet to the transmission and reception unit 210 in order to transmit through a network.

For example, when the communication apparatus 200 operates as one or more of the source nodes 110 to 118, the controller 210 may generate a packet, for example, one of $P_1$ to $P_n$, and the transmission and reception unit 210 may transmit the generated packet to the relay node 130 and/or the target node 150.

As another example, when the communication apparatus 200 operates as the relay node 130, the transmission and reception unit 210 may receive packets, for example, $P_1$ to $P_n$, from the source nodes 110 to 118, and the controller 220 may generate an output packet $P_0$ based on the received packets. The generated output packet may be transmitted to the target node 150 through the transmission and reception unit 210.

As another example, when the communication apparatus 200 operates as the target node 150, the transmission and reception unit 210 may receive packets, for example, packets $P_1$ to $P_n$ and $P_0$, from the source nodes 110 to 118 and the relay node 130. One or more of the packets may be corrupted. Accordingly, the controller 220 may reconstruct packets transmitted by the source nodes, for example $P_1$ to $P_n$ and $P_0$, based on the received packets.

Figure 3:
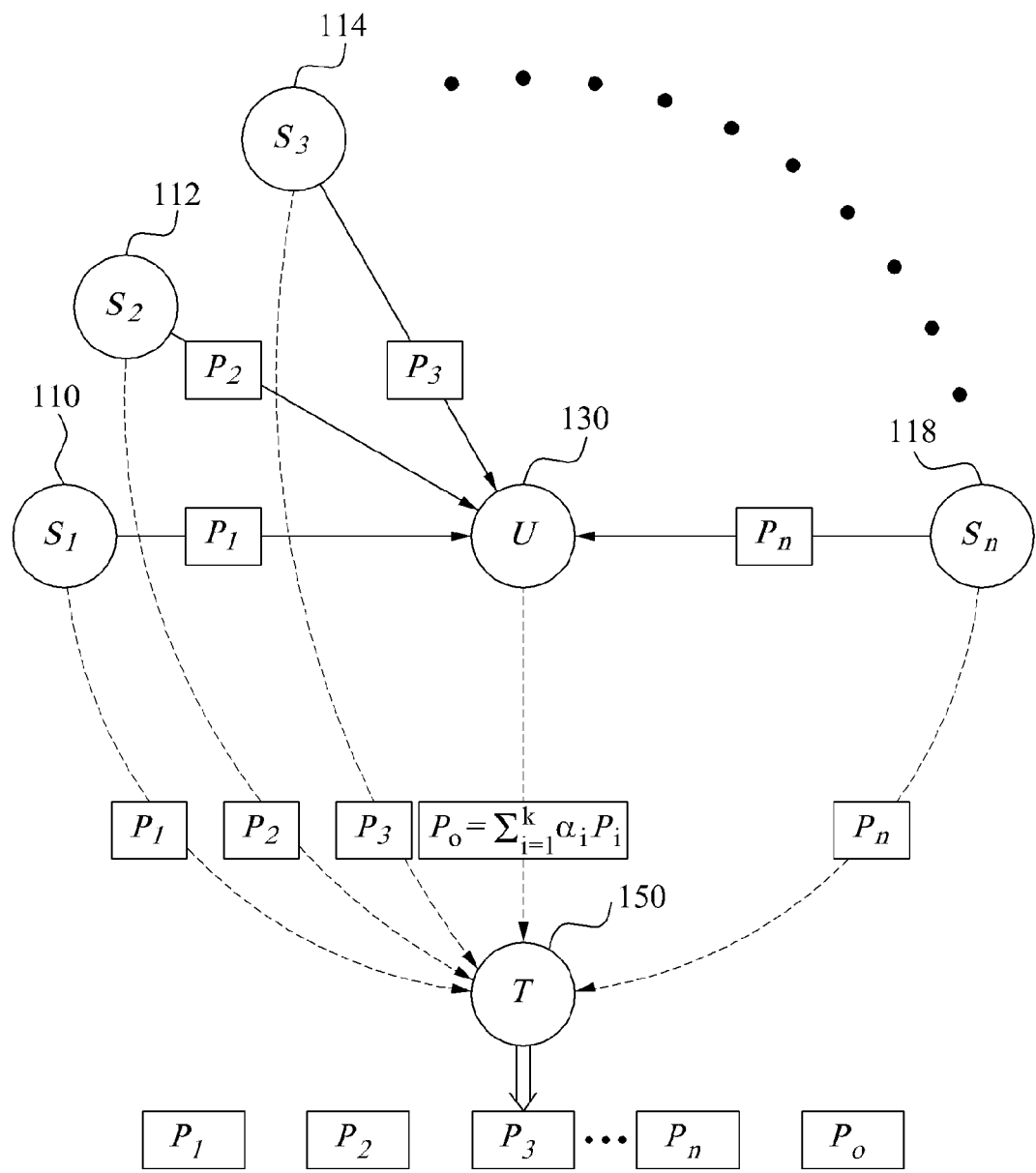
FIG. 3 is a diagram illustrating an example of a communication system using a linearly combining network coding scheme.

FIG. 3 illustrates an example of a communication system using a linearly combining network coding scheme.

In this example, the system includes the same components as the system described above with reference to FIG. 1, and thus, further description thereof is omitted.

For example, packets $P_1$ to $P_n$ generated by the source nodes 110 to 118 may include L symbols selected from $\mathbb{F}_{2^m}$. For example, when one symbol has a length of m, a length of each of $P_1$ to $P_n$ may be Lm.

The relay node 130 may generate an output packet $P_0$ using a linear combination on the packets $P_1$ to $P_n$ received from the source nodes. The linear combination may be represented by the following Equation 1.

$$\Sigma_{i=1}^{k} \alpha_i P_i \quad \text{[Equation 1]}$$

In this example, $\alpha_i$ is a value selected from $\mathbb{F}_{2^m}$.

The network coding may be applied to an analog domain.

For example, when an error does not occur between communication links, packets having at least N linearly independent coefficient vectors may be used to reconstruct the packet $P_1$ to $P_n$.

An order of the N packets may be expressed by a superscript. For example, $P_o^l$ may be used to represent an packet $l^{th}$ generated by the relay node 130.

Where $l=1, 2, \ldots, N$, the relay node 130 may generate each output packet $P_o^l$ by the following Equation 2.

$$P_o^l = \sum_{i=1}^{N} \alpha_i^l P_i \qquad \text{[Equation 2]}$$

In this example, with respect to all i and l, $\alpha_i^l \in \mathbb{F}_{2^m}$

A packet output by the source nodes 110 to 118 and the relay node 130 may include a plurality of elements. For example, the elements may be a determined number of symbols. The elements are referred to as a sub-packet. A $j^{th}$ element of a packet $P_i$ is represented by $P_i(j)$, and a $j^{th}$ element of a packet $P_0$ is represented by $P_0(j)$.

In this example, where $j=1, 2, \ldots, N$, $P_i(j), P_o^l(j) \in \mathbb{F}_{2^m}$.

When the packet formed of the above elements is used, the relay node 130 may generate an element $P_o^l(j)$ of an output packet $P_o^l$ represented by the following Equation 3. In this example, $P_o^l$ includes the elements $P_o^l(1)$ to $P_o^l(N)$.

$$P_o^l(j) = \sum_{i=1}^{N} \alpha_i^l P_i(j) \qquad \text{[Equation 3]}$$

In this example, $\tilde{P}_o(j)=(P_o^1(j), \ldots, P_o^N(j))$, $\tilde{P}(j)=(P_1(j), \ldots, P_N(j))$ and $$A = \begin{pmatrix} \alpha_1^1 & \alpha_1^2 & \cdots & \cdots & \alpha_1^N \\ \alpha_2^1 & \alpha_2^2 & \cdots & \cdots & \alpha_2^N \\ \vdots & \vdots & \ddots & \ddots & \vdots \\ \alpha_N^1 & \alpha_N^2 & \cdots & \cdots & \alpha_N^N \end{pmatrix}$$

are defined to establish the following Equation 4.

$$\tilde{P}_o(j) = \tilde{P}(j)\Lambda \qquad \text{[Equation 4]}$$

Equation 4 represents a linear system formed of linear equations in $\mathbb{F}_{2^m}$. For example, when a matrix $\Lambda$ is invertible, a solution may be found by the following Equation 5 where $j=1, 2, \ldots, L$.

$$\tilde{P}(j) = \Lambda^{-1}\tilde{P}_o(j) \qquad \text{[Equation 5]}$$

For example, the target node 150 may use an inverse matrix to the matrix $\Lambda$ to identify a $j^{th}$ element of N packets output by the source nodes 110 to 118 from a $j^{th}$ element of N output packets of the relay node 130 which are received by the target node 150.

Thus, the target node 150 may generate the same packets as the N packets output by the source nodes 110 to 118.

As shown in Equation 5, when an error occurs in one of symbols of $\tilde{P}_o(j)$, the error may influence the generating values of a plurality of symbols from among symbols of $\tilde{P}(j)$.

As described herein, when the source nodes 110 to 118 generate a packet by encoding a message to be transmitted using a codebook before the message is output, the above error may be corrected.

For example, where $l=1, 2, \ldots, L$, a source node $S_l$ may encode a message $T_l$ to be transmitted using a codebook $C_l$. Accordingly, a packet $P_l$ may be generated. Then, even though the target node 150 generates part of values of $P_l(j)$ incorrectly, $T_l$ may be reconstructed correctly while the target node 150 decodes $P_l$ using $C_l$.

Hereinafter, an example in which there are K linear combinations of packets $P_1$ to $P_n$ received by the target node 150 is described. In this example, $$P_o^l = \sum_{i=1}^{N} \alpha_i^l P_i$$

is received where $l=1, 2, \ldots, K$.

For example, when a generator matrix G is defined as $$G = \begin{pmatrix} \alpha_1^1 & \alpha_1^2 & \cdots & \cdots & \alpha_1^K \\ \alpha_2^1 & \alpha_2^2 & \cdots & \cdots & \alpha_2^K \\ \vdots & \vdots & \ddots & \ddots & \vdots \\ \alpha_N^1 & \alpha_N^2 & \cdots & \cdots & \alpha_N^K \end{pmatrix},$$

$\tilde{P}_o(j)=(P_o^1(j), \ldots, P_o^K(j))$, and $\tilde{P}(j)=(P_1(j), \ldots, P_N(j))$, the following Equation 6 is established.

$$\tilde{P}_o(j) = \tilde{P}(j)G \qquad \text{[Equation 6]}$$

Equation 6 is a linear code represented by a generator matrix G in $\mathbb{F}_{2^m}$, and is encoded $\tilde{P}_j$. When K>N is established, the linear code may theoretically be used for uncoded P1 to Pn, which are not encoded by the codebook, in order to correct an error.

For example, encoding messages $T_1$ to $T_n$ into packets $P_1$ to $P_n$ using a vertical codebook $C_1, C_2, \ldots, C_N$ in the source nodes 110 to 118 may be referred to as a vertical encoding. As another example, encoding respective rows of $P_1$ to $P_n$ by the linear code of the generator matrix G to generate a linearly combined output packet $P_0$ in the relay node 130 may be referred to as a horizontal encoding. That is, $P_0$ may be considered to be encoded by a two-dimensional product code.

For example, the target node 150 may perform a horizontal decoding and a vertical decoding on the received output packet $P_0$ to generate the original message $T_1$.

The vertical encoding, the horizontal encoding, the vertical decoding, and the horizontal decoding may be performed by the controller 210 of the communication apparatus 200.

Figure 4:
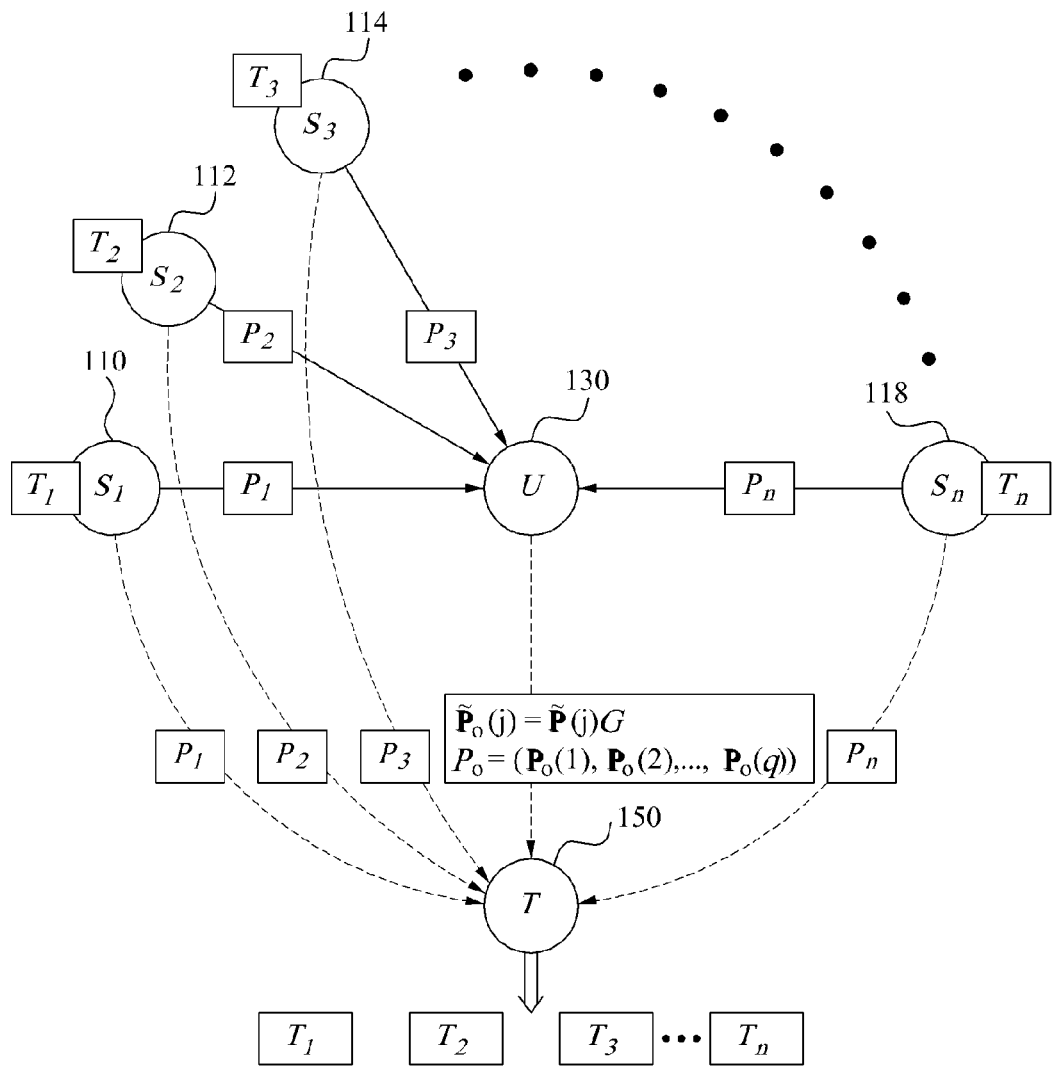
FIG. 4 is a diagram illustrating an example of a communication system using a matrix network coding scheme.

FIG. 4 illustrates an example of a communication system using a matrix network coding scheme.

In this example, the system includes the same components as the system described above with reference to FIG. 1, and thus, further description thereof is omitted.

The respective source nodes 110 to 118 may vertically encode messages $T_1$ to $T_n$ to generate packets $P_1$ to $P_n$, and may transmit the packets to the relay node 130 and/or the target node 150.

For example, the relay node 130 may horizontally encode the packets $P_1$ to $P_n$ input from the source nodes 110 to 118 to generate an output packet $P_0$, and may transmit the output packet $P_0$ to the target node 150. The horizontal encoding is further described with reference to FIG. 7.

The target node 150 may horizontally and vertically decode the packets $P_1$ to $P_n$ and $P_0$ that are received from the source nodes 110 to 118 and the relay node 130, to generate the messages $T_1$ to $T_n$.

The packets $P_1$ to $P_n$ and $P_0$ received by the relay node 130 and the target node 150 may be corrupted. Even though the packets may be corrupted, the horizontal decoding and the vertical decoding may reconstruct and generate the uncoded original messages $T_1$ to $T_n$. Accordingly, message loss may be reduced.

Figure 5:
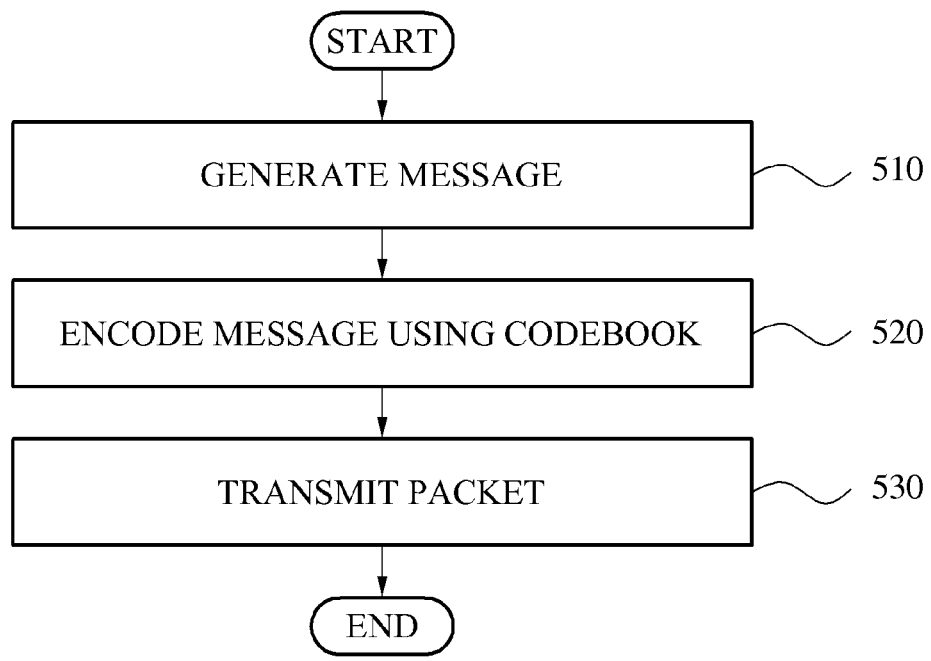
FIG. 5 is a flowchart illustrating an example of a method of a source node in a communication system using a matrix network coding scheme.

FIG. 5 illustrates an example of a method of a source node in a communication system using a matrix network coding scheme.

For example, one of the source nodes $S_1$ to $S_n$, 110 to 118 in the system may be referred to as $S_i(0 \leq i \leq k)$. In this example, $S_i$ generates a message $T_i$ to transmit, in 510.

In 520, $S_i$ encodes the message $T_i$ using a codebook $C_i$ to generate a packet $P_i$ formed of symbols. An uncoded case where $C_i$ of some source nodes from among the source nodes 110 to 118 represents uncoded transmission is also included, in 520. For example, the symbols may be generated in a binary field $\mathbb{F}_2$. As another example, the symbols may be generated in a general finite field $\mathbb{F}_{2^m}$.

In 530, $S_i$ transmits the packet $P_i$ to the relay node 130 and the target node 150.

Referring again to FIG. 2, operation 530 associated with output of the packet may be performed by the transmission and reception unit 210, and the other operations 510 and 520 may be performed by the controller 220.

Figure 6:
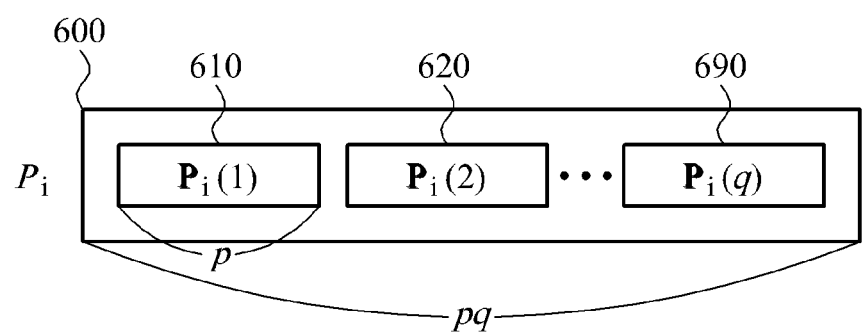
FIG. 6 is a diagram illustrating an example of a packet output by a source node in a communication system using a matrix network coding scheme.

FIG. 6 illustrates an example of a packet output by a source node in a communication system using a matrix network coding scheme.

In this example, the packet $P_i$ 600 includes a plurality of p-dimensional vectors 610 to 690. For example, the packet $P_i$ 600 may be expressed by a sequence having a length of q such as $P_i(1), P_i(2), \ldots, P_i(q)$. The p-dimensional vectors 610 to 690 may be referred to as a sub-input packet.

Further, the packet $P_i$ 600 has a length L of pq.

Thus, where $j=1, 2, \ldots, q$, the following Equation 7 may be established.

$$P_i(j)=(P_i((j-1)p+1),P_i((j-1)p+2),\ldots,P_i(jp)) \quad \text{[Equation 7]}$$

Figure 7:
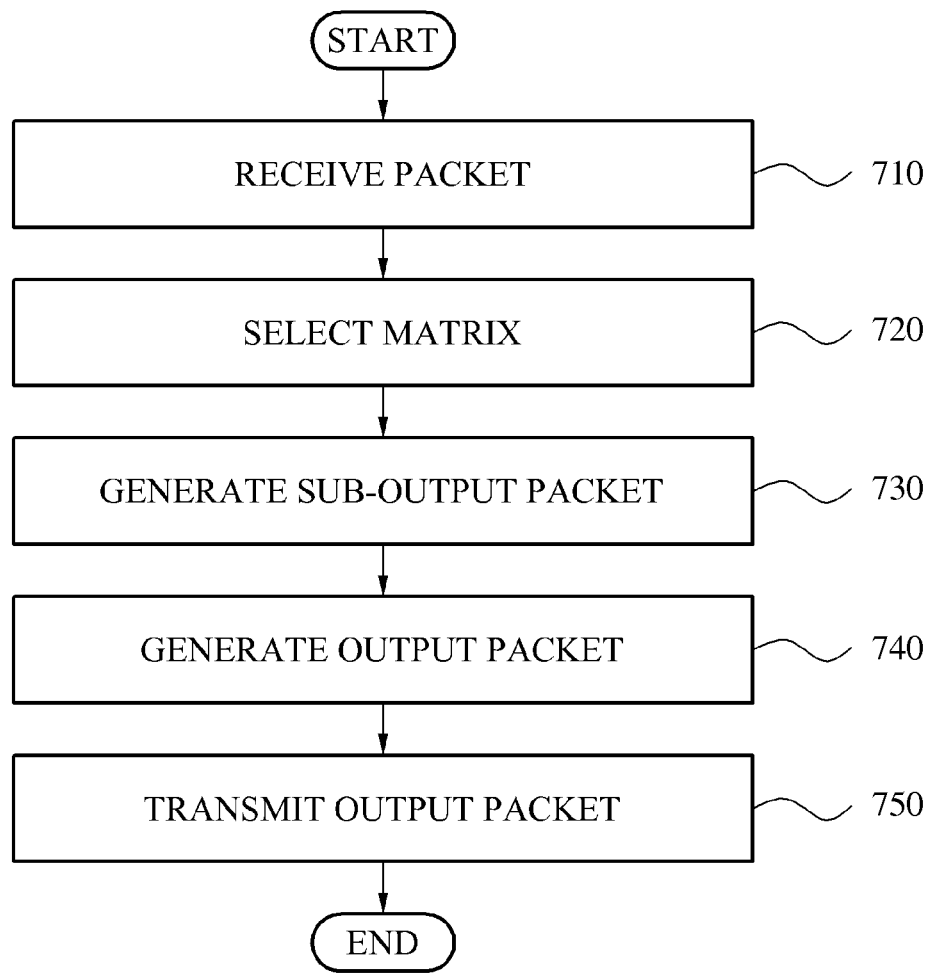
FIG. 7 is a flowchart illustrating an example of a method of a relay node in a communication system using a matrix network coding scheme.

FIG. 7 illustrates an example of a method of a relay node in a communication system using a matrix network coding scheme.

In 710, the relay node receives k packets $P_s^1, P_s^2, \ldots, P_s^k$. As shown in FIG. 6, the packets may include q sub-input packets having a length of p. Each packet $P_s^i$ may be a block of consecutive p symbols, where $i=1, 2, \ldots, k$, and may be represented by the following Equation 8.

$$P_s^i=(P_s^i(1),P_s^i(2),\ldots,P_s^i(q)) \quad \text{[Equation 8]}$$

In addition, where $j=1, 2, \ldots, q$, the following Equation 9 is established.

$$P_s^i(j)=(P_s^i((j-1)p+1),P_s^i((j-1)p+2),\ldots,P_s^i(jp)) \quad \text{[Equation 9]}$$

In 720, the relay node selects k p×p matrices $A_1, A_2, \ldots, A_k$, which are k matrices having p rows and p columns. The matrices may be referred to as a combining coefficient. For example, the matrices may be selected randomly.

Where $j=1, 2, \ldots, q$, in 730 an element of an output packet $P_O$ is generated based on the following Equation 10.

$$P_o(j)=A_1P_s^1(j)+A_2P_s^2(j)+\ldots+A_kP_s^k(j) \quad \text{[Equation 10]}$$

For example, when an $i^{th}$ matrix $A_i$ multiplied by a $j^{th}$ element $P_s^i(j)$ of an $i^{th}$ input packet $P_s^i$ is defined as an ij multiplied matrix, and where $i=1, 2, \ldots, k$, a $j^{th}$ sub-output packet is a sum of a 1j multiplied matrix to a kj multiplied matrix.

In 740, an output packet $P_O$ is generated based on the following Equation 11.

$$P_O=(P_O(1),P_O(2),\ldots,P_o(q)) \quad \text{[Equation 11]}$$

The generated output packet $P_O$ is transmitted to the target node, in 750.

In the above description, each combining coefficient may be invertible, for example, each combining coefficient may have an inverse matrix. For example, where p=1, the matrix network coding is substantially the same scheme as the linear network coding. Thus, the matrix network coding is based on $p \geq 2$.

Thus, a packet transmitted by a node in the network has a form in Equation 11 with respect to $j=1, 2, \ldots, q$ and the p×p matrices $B_1, \ldots, B_N$.

In this example, $P(j)=B_1P_1(j)+B_2P_2(j)+\ldots+B_NP_N(j)$. That is, a matrix linear combination may be performed on $P_1$ to $P_n$ using matrix network coding coefficients $B_1, \ldots, B_N$.

When the target node receiving the packet receives K matrix linear combinations of P1 to Pn (K≥N), the node may receive $$P_o^l(j) = \sum_{i=1}^{N} B_i^l P_i(j)$$

where $j=1, 2, \ldots, q$ and $l=1, 2, \ldots, K$.

In this example, $$G = \begin{pmatrix} B_1^1 & B_1^2 & \ldots & \ldots & B_1^K \\ B_2^1 & B_2^2 & \ldots & \ldots & B_2^K \\ \vdots & \vdots & \ddots & \ddots & \vdots \\ B_N^1 & B_N^2 & \ldots & \ldots & B_N^K \end{pmatrix},$$

$\tilde{P}_0(j)=(P_0^1(j), \ldots, P_0^K(j))$, and $\tilde{P}(j)=(P_1(j), \ldots, P_N(j))$, and thus $\tilde{P}_0(j)=\tilde{P}(j)G$ is established.

For example, when K=N, and the matrix G has an inverse matrix, $\tilde{P}(j)=\tilde{P}_0(j)G^{-1}$ is calculated where $j=1, 2, \ldots, q$, and vectors $P_1(j), \ldots, P_N(j)$ may be calculated with respect to each j. Thus, when a transmission error does not occur at all, original packets $P_1$ to $P_n$ may be reconstructed.

Referring again to FIG. 2, operations 710 and 750 associated with the reception and transmission of packets may be performed by the transmission and reception unit 210, and the other operations 720 to 740 may be performed by the controller 220.

Figure 8:
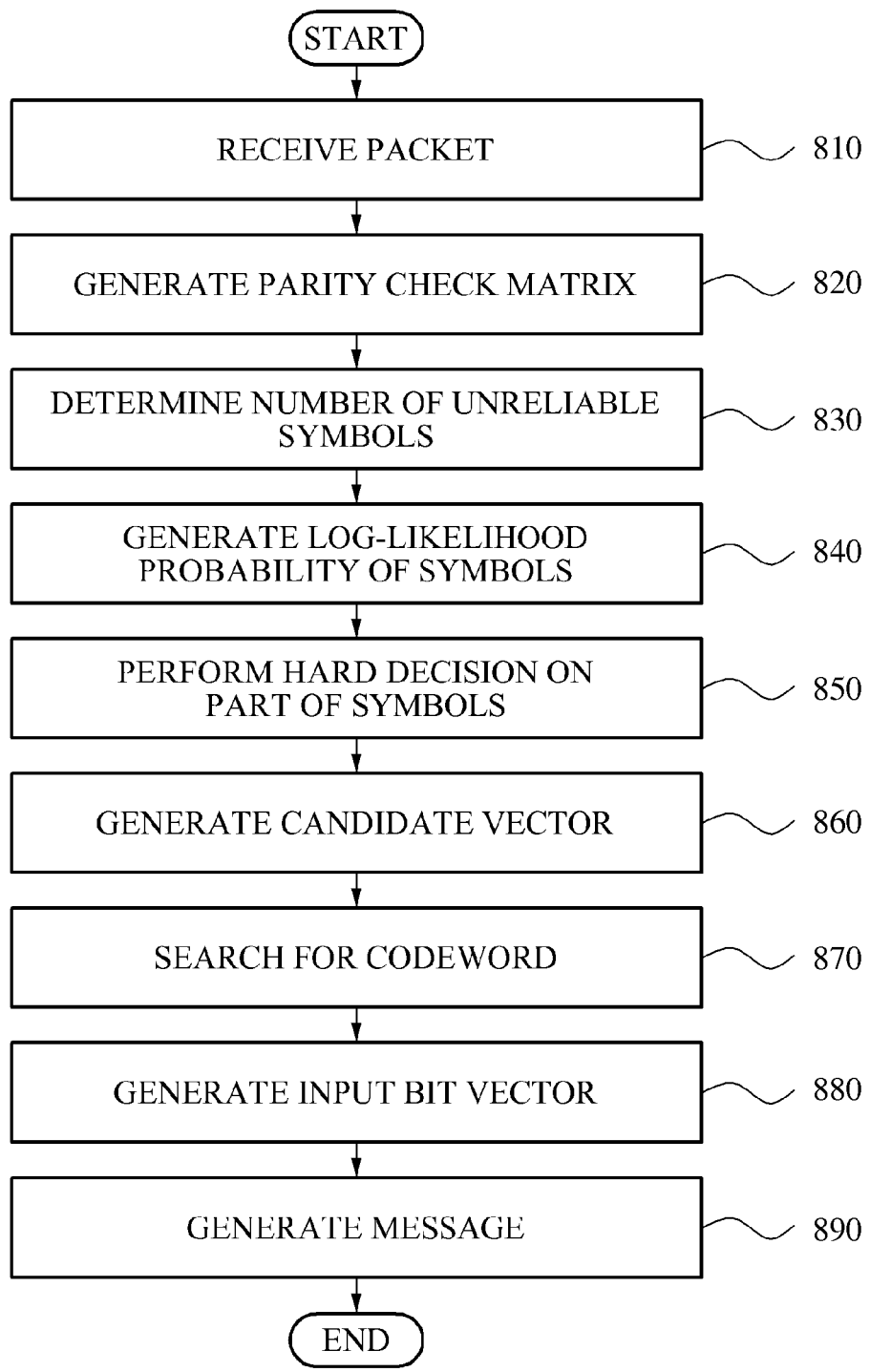
FIG. 8 is a flowchart illustrating an example of a method of a target node decoding a received packet in a communication system using a matrix network coding scheme.

FIG. 8 illustrates an example of a method of a target node decoding a received packet in a communication system using a matrix network coding scheme.

This example includes a transformed sphere decoding process and a maximum a posteriori probability (MAP) decoding process.

The transformed sphere decoding process is described first.

The target node receives an output packet $P_O$, in 810.

The received packet may be corrupted during transmission. In this example, $R(j), j=1, 2, \ldots, q$ represents a received word $\tilde{P}_0(j)$ corrupted by Gaussian noise.

The target node generates a parity check matrix H from a generator matrix G, in 820.

In 830, the target node determines a number of unreliable symbols. For example, the number of unreliable symbols may be expressed by w which may be determined by the following Equation 12.

$$w = \max\left(\left\lfloor \frac{p(K-N)}{2} \right\rfloor, \left\lfloor K_p P_{err} + 3\sqrt{K_p P_{err}(1-P_{err})} \right\rfloor + 1\right) \quad \text{[Equation 12]}$$

In this example, $P_{err}$ denotes a bit error probability.

For example, when a bit error is generated statistically independently, a packet having a length of K in a unit of a symbol may have an average bit error of $KpP_{err}$ and a dispersion of $KpP_{err}(1-P_{err})$. For example, when w is determined to have a value obtained by adding a triple standard deviation to an average value, a large portion of probable outcomes mostly generated by an error Bernoulli process may be captured.

In 840, the target node generates a log-likelihood probability of each element, which is a symbol, of Kp-dimensional $\tilde{P}_0(j)$ of R(j) where j=1, 2, . . . , q.

The target node may compare absolute values of the generated log-likelihood probabilities and may search for w elements having smaller absolute values of log-likelihood probabilities from among the elements of $\tilde{P}_0(j)$. Respective positions of the w elements may be referred to $i_1$ to $i_w$. In this example, $1 \le i_1 \le i_2 \le \ldots \le i_w \le K_p$.

The target node performs a hard decision on elements in remaining positions except for $i_1$ and $i_w$ in R(j), in 850. For example, among the elements in the remaining positions, elements having a positive log-likelihood result may be changed to 1, and elements having a negative log-likelihood result may be changed to 0.

In this example, the results of the hard decision are expresses as $\mathcal{R}$.

In 860, the target node generates $2^w$ different candidate vectors $\mathcal{R}_1, \mathcal{R}_2, \ldots, \mathcal{R}_{2^w}$. For example, the candidate vectors may be generated by filling the positions of $i_1 < i_2 < \ldots < i_w$ of $\mathcal{R}$ with all possible binary numbers. In this example, the candidate vectors are generated by binary expansion of $0, 1, \ldots, 2^w-1$ with respect to $\mathcal{R}$.

The target node searches for $\mathcal{R}_i, i=1, 2, \ldots, 2^w$ satisfying $H\mathcal{R}_i=0$ from among the candidate vectors $\mathcal{R}_i, i=1, 2, \ldots, 2^w$, in 870. For example, $\mathcal{R}_i, i=1, 2, \ldots, 2^w$ may be codewords of G.

For convenience of description, the vectors, which are codewords, are relabeled in number into $\mathcal{R}_1, \mathcal{R}_2, \ldots, \mathcal{R}_u$ with respect to $0 \le u \le 2^w-1$. When there is no $\mathcal{R}_i$ which satisfies $H\mathcal{R}_i=0$.

The target node calculates an input bit vector vi, i=1, 2, . . . , u, encoded into a codeword $\mathcal{R}_i$ with respect to each of $\mathcal{R}_i$, i=1, 2, . . . , u, in 880.

Next, the transformed MAP decoding process is described in 890.

When a number of the input bit vectors u is greater than 0, the MAP decoding may be performed as follows.

The target node may calculate a log-likelihood value of each bit of $\tilde{P}(j)$ using the received vector R(j) when possible values of $\tilde{P}(j)$ are the input bit vectors vi, i=1, 2, . . . , u. That is, $P_l^1$ and $P_l^0$ may be calculated through the following Equations 13 and 14, and a log-likelihood ratio (LLR) of an $1^{th}$ bit of $\tilde{P}(j)$ may be generated, where the LLR of the $1^{th}$ bit is expressed by $\log(p_l^1/p_l^0)$.

$p_l^1 = P(R(j)|v_i, i=1,2,\ldots u$ with 1-th bit equal to 1) [Equation 13]

$p_l^0 = P(R(j)|v_i, i=1,2,\ldots u$ with 1-th bit equal to 0) [Equation 14]

When the number of the input bit vectors u is 0, the target node may make the log-likelihood values of all bits of $\tilde{P}(j)$ be 0.

According to the above process, log-likelihood values of all elements of $P_i$, i=1, 2, . . . , N, may be calculated.

For example, the target node may generate messages $T_1$ to $T_n$ generated by the source nodes 110 to 118 using the log-likelihood values, a MAP for $C_i$, and a soft or hard decoder, in 890.

Referring again to FIG. 2, operation 810 associated with the reception of packets may be performed by the transmission and reception unit 210, and the other operations 820 to 890 may be performed by the controller 220.

Figure 9:
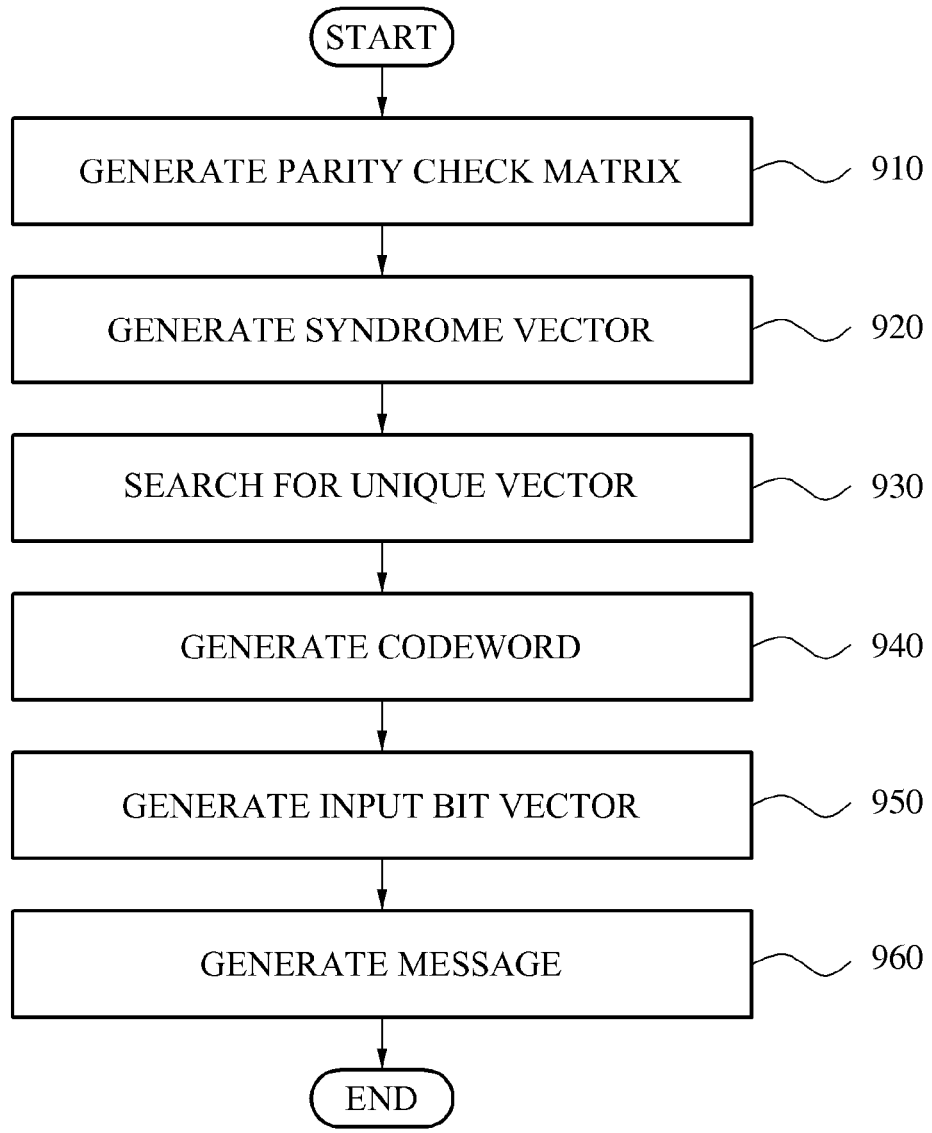
FIG. 9 is a flowchart illustrating an example of a method of a target node decoding a received packet in a communication system using a matrix network coding scheme.

FIG. 9 illustrates an example of a method of a target node decoding a received packet in a communication system using a matrix network coding scheme.

The example described with reference to FIG. 9 is referred to as a coset decoding.

The coset decoding is formed by generalizing the transformed sphere decoding process and the MAP decoding process into binary symmetric channels.

The target node using the coset decoding first performs a hard decision on a received word. Thus, the coset decoding consumes less power in the decoding processing as compared with the transformed sphere decoding.

R(j), j=1, 2, . . . , q, may be a vector generated by the hard decision. For example, the vector may be generated by applying the hard decision on a received signal by the target node.

In this example, R(j), j=1, 2, . . . , q may have $\tilde{P}_0(j)$ as an input and may be modeled as an output of a binary symmetric channel having a transition probability of $P_{err}$.

In 910, the target node generates a parity check matrix H of a generator matrix G.

For example, when a codebook created by the matrix G is referred to as C, and a binary string having a minimal Hamming weight is referred to as $x_i$, the target node may list all $2^{p(K-N)}$ cosets $x_i+C$, i=1, 2, . . . , $2^{p(K-N)}$ and also may list $x_iH$ with respect to i=1, 2, . . . , $2^{p(K-N)}$.

In 920, the target node calculates and generates a syndrome vector R(j)H with respect to R(j) where j=1, 2, . . . , q.

The target node searches for a unique vector $x_*$ satisfying $R(j)H=x_*H$ with respect to all $x_i$, i=1, 2, . . . , $2^{p(K-N)}$, in 930.

The target node generates a codeword of G $\mathcal{R}=R(j)+x_*$, in 940.

In 950, the target node calculates and generates an input bit vector $v_j$ encoded by the generator matrix G into a codeword $\mathcal{R}$. In this example, $v_j$ is an estimate of $\tilde{P}(j)$.

According to the above process, estimates of all bits of $P_i$, i=1, 2, . . . , N, may be calculated.

The target node generates messages $T_1$ to $T_n$ generated by the source nodes 110 to 118 using the estimates and a hard decision decoder for $C_i$, in 960.

Referring again to FIG. 2, operation 910 associated with the reception of packets may be performed by the transmission and reception unit 210, and the other operations 920 to 960 may be performed by the controller 220.

As described in the above examples, the target node may selectively use one of the transformed sphere decoding and the coset decoding depending on a state of the node.

For example, the selection from the transformed sphere decoding and the coset decoding may be determined based on a state of the target node, and the target node may be provided with sufficient power.

As a non-exhaustive illustration only, the node or terminal device described herein may refer to mobile devices such as a cellular phone, a personal digital assistant (PDA), a digital camera, a portable game console, an MP3 player, a portable/personal multimedia player (PMP), a handheld e-book, a portable lab-top personal computer (PC), a global positioning system (GPS) navigation, and devices such as a desktop PC, a high definition television (HDTV), an optical disc player, a setup box, and the like, capable of wireless communication or network communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It should be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

The processes, functions, methods and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable storage media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and non-transitory computer-readable codes or program instructions may be stored and executed in a decentralized manner.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A communication apparatus, comprising:
a transmission and reception unit configured to receive a first packet; and
a controller configured to decode the first packet to generate information of N second packets, and to decode the N second packets using the information to generate N messages, wherein
the first packet is a packet generated using a matrix network coding on the N second packets, the N second packets are packets generated by encoding the N messages using N codebooks, and N is an integer value greater than zero.

2. The communication apparatus of claim 1, wherein when an error does not occur between communication links, packets having at least Np linearly independent coefficient vectors are used to reconstruct the N input messages, wherein p is an integer value greater than one.

3. The communication apparatus of claim 1, wherein first to $k^{th}$ matrices are, each including p rows and p columns, used to generate the N second packets from the N messages, wherein the first to $k^{th}$ matrices are randomly selected, and k is an integer value greater than zero.

4. The communication apparatus of claim 1, wherein
a $j^{th}$ sub-output packet of the first packet is a sum of a 1j multiplied matrix to a kj multiplied matrix when $1<i<k$, $1<j<q$, and a matrix multiplied by a $j^{th}$ sub-input packet of an $i^{th}$ input packet is defined as an ij multiplied matrix, and i and j are integer values greater than zero.

5. A decoding method, the method comprising:
receiving a first packet;
decoding, at a processor, the first packet to generate information of N second packets; and
decoding, using the processor, the N second packets using the information to generate N messages, wherein the first packet is a packet generated using matrix network coding on the N second packets, the N second packets are packets generated by encoding the N messages using N codebooks, and N is an integer value greater than zero.

6. A communication apparatus, comprising:
a reception unit configured to receive a packet including an input word; and
a controller configured to estimate a first decoded word corresponding to the input word based on the input word and a generator matrix, to generate a second decoded word corresponding to the input word based on a codebook and the first decoded word, and to generate a message based on the second decoded word, wherein the codebook is based on the generator matrix.

7. The communication apparatus of claim 6, wherein the input word is a corrupted word.

8. The communication apparatus of claim 6, wherein the controller estimates the first decoded word by generating an input bit vector using the generator matrix and generating a log-likelihood value of the first decoded word corresponding to the input word based on the input bit vector and the input word to estimate the first decoded word.

9. The communication apparatus of claim 6, wherein the controller generates the second decoded word based on the estimated first decoded word and a map for the codebook using a soft or hard decoder.

10. The communication apparatus of claim 6, wherein the controller generates a parity check matrix based on the generator matrix, generates a syndrome vector obtained by multiplying the parity check matrix by the input word, searches a unique vector among binary strings having a minimal Hamming weight for a product of the unique vector multiplied by the parity check matrix being the syndrome vector, generates a codeword, which is a sum of the input word and one of the unique vector, generates an input bit vector encoded by the generator matrix into one of the codeword, and estimates the input bit vector to be the first decoded word.

11. The communication apparatus of claim 6, wherein the controller generates the second decoded word based on the estimated first decoded word and the code book using a hard decoder.

12. The communication apparatus of claim 6, wherein the controller estimates the first decoded word by selecting one of a transformed sphere decoding and coset decoding based on a state of the communication apparatus.

13. A network coding method, comprising:
receiving a packet including an input word;
estimating, at a controller, a first decoded word corresponding to the input word based on the input word and a generator matrix;
generating, at the controller, a second decoded word corresponding to the input word based on a codebook and the first decoded word; and
generating, at the controller, a message based on the second decoded word, wherein the codebook is based on the generator matrix.

14. A decoding apparatus, comprising:
a transmission and reception unit configured to receive a matrix linear combination of first packets and second packets, wherein the second packets is a linear combination of the first packets; and
a controller configured to calculate a product of an inverse matrix of a generator matrix and the second packets, and to calculate vectors of the first packets to decode the first packets and generate original messages.

15. The decoding apparatus of claim 14, wherein each first packet comprises q sub-input packets having a length p, where q and p are integer values greater than zero.

16. The decoding apparatus of claim 15, wherein the q sub-input packets are dimensional vectors, the first packets are input packets, and the second packets is an output packet.

17. A decoding method, comprising:
receiving a matrix linear combination of first packets and a second packets at a transmission and reception unit, wherein the second packets is a matrix linear combination of the input packets;
calculating, at a controller, a product of an inverse matrix of a generator matrix with the second packets; and
calculating, at the controller, vectors of the first packets to decode the first packets and generate original messages.

* * * * *